United States Patent
Ogata et al.

(10) Patent No.: US 10,401,259 B2
(45) Date of Patent: Sep. 3, 2019

(54) ROTATION PULSATION GENERATING MECHANISM (71) Applicant: TOYOTA JIDOSHA KABUSHIKI KAISHA, Toyota-shi (JP)

(72) Inventors: Taizan Ogata, Toyota (JP); Yuji Suzuki, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/848,170

(22) Filed: Dec. 20, 2017

(65) Prior Publication Data
US 2018/0180514 A1   Jun. 28, 2018

(30) Foreign Application Priority Data

Dec. 27, 2016   (JP) .................................. 2016-253649

(51) Int. Cl.
| | |
|---|---|
| *F16H 21/12* | (2006.01) |
| *F16H 21/48* | (2006.01) |
| *F16H 25/08* | (2006.01) |
| *G01M 13/025* | (2019.01) |
| *G01M 13/021* | (2019.01) |
| *G01M 13/022* | (2019.01) |
| *B60K 6/36* | (2007.10) |
| *G01M 13/02* | (2019.01) |

(52) U.S. Cl.
CPC ............. *G01M 13/025* (2013.01); *B60K 6/36* (2013.01); *G01M 13/02* (2013.01); *G01M 13/021* (2013.01); *G01M 13/022* (2013.01)

(58) Field of Classification Search
CPC .. G01M 13/025; G01M 13/02; G01M 13/021; G01M 13/022; B60K 6/36

USPC ............................................................ 74/63
See application file for complete search history.

(56) References Cited

U.S. PATENT DOCUMENTS

| | | | | |
|---|---|---|---|---|
| 3,260,124 A | * | 7/1966 | Hasselblad | ............... B23B 7/10 29/38 B |
| 3,624,660 A | * | 11/1971 | Fichter | ..................... G01P 1/122 346/49 |
| 3,855,599 A | * | 12/1974 | Helmschrott | ............ G07C 5/06 346/123 |
| 8,640,660 B2 | | 2/2014 | Frickmann | |

FOREIGN PATENT DOCUMENTS

| | | |
|---|---|---|
| JP | 2009-287986 | 12/2009 |
| JP | 2014-87737 | 5/2014 |

OTHER PUBLICATIONS

"Camshaft-Wikipedia", Nov. 21, 2016, 6 pages.

* cited by examiner

*Primary Examiner* — Jake Cook
(74) *Attorney, Agent, or Firm* — Oblon, McClelland, Maier & Neustadt, L.L.P.

(57) ABSTRACT

A rotation pulsation generating mechanism includes a drive motor, a transmission coupled between the drive motor and a rotation target, a cam fixed to a rotary shaft between the drive motor and the transmission so as be rotated by the drive motor, and a cam follower biased so as to press the cam. The cam pressed by the cam follower is rotated by the drive motor so as to generate rotation pulsation according to a rotational speed of the drive motor, and the rotational speed of the drive motor is changed by the transmission to a rotational speed of the rotation target different from that of the drive motor, so that a given order of rotation pulsation is applied to the rotation target.

5 Claims, 10 Drawing Sheets

SPEED
REDUCTION

FIG. 2B

SPEED
INCREASE

SPEED REDUCTION

FIG. 4B

SPEED INCREASE

ROTATION PULSATION GENERATING MECHANISM

INCORPORATION BY REFERENCE

The disclosure of Japanese Patent Application No. 2016-253649 filed on Dec. 27, 2016 including the specification, drawings and abstract is incorporated herein by reference in its entirety.

BACKGROUND

1. Technical Field

The disclosure relates to a rotation pulsation generating mechanism, and particularly relates to a rotation pulsation generating mechanism that generates a given order of rotation pulsation by means of a drive motor, and applies the rotation pulsation to a rotation target.

2. Description of Related Art

A rotation pulsation generating mechanism disclosed in Japanese Patent Application Publication No. 2009-287986 (JP 2009-287986 A) simulates rotation pulsation of a given order that is determined by the rotational speed of a reciprocating engine and the number of cylinders in the engine, by means of a drive motor, and applies the rotation pulsation to a rotation target or object. In this specification, "rotation pulsation" refers to variations in the rotational speed or rotary torque, which periodically occur along with rotation.

SUMMARY

In the rotation pulsation generating mechanism disclosed in JP 2009-287986 A, the rotation pulsation is generated by directly electrically increasing or reducing the rotational speed of the drive motor. Therefore, the capacity of the drive motor needs to be large, and control of the drive motor may be complicated.

This disclosure provides a rotation pulsation generating mechanism in which the capacity of a drive motor is small, and the drive motor can be easily controlled.

A rotation pulsation generating mechanism according to one aspect of the disclosure includes a drive motor, a transmission coupled between the drive motor and a rotation target, a cam fixed to a rotary shaft between the drive motor and the transmission and configured to be rotated and driven by the drive motor, and a cam follower configured to be biased so as to press the cam. In the rotation pulsation generating mechanism, the cam pressed by the cam follower is configured to be rotated and driven by the drive motor so as to generate rotation pulsation according to a rotational speed of the drive motor, and the transmission is configured to change the rotational speed of the drive motor to a rotational speed of the rotation target which is different from the rotational speed of the drive motor, so that a given order of rotation pulsation is applied to the rotation target.

In the rotation pulsation generating mechanism according to the above aspect of the disclosure, the cam pressed by the cam follower is rotated and driven by the drive motor, so that rotation pulsation according to the rotational speed of the drive motor is generated, and the rotational speed of the drive motor is changed by the transmission to the rotational speed of the rotation target which is different from that of the drive motor, so that the given order of rotation pulsation is applied to the rotation target. Namely, the given order of rotation pulsation is mechanically generated, without directly electrically increasing or reducing the rotational speed of the drive motor. Therefore, the capacity of the drive motor can be reduced, and the drive motor can be easily controlled.

In the rotation pulsation generating mechanism as described above, the transmission may include a planetary gear, and an adjustment motor coupled to the planetary gear, and a rotational speed of the adjustment motor may be changed, so as to change a speed ratio of the transmission. By adjusting the rotational speed of the adjustment motor, it is possible to change the speed ratio of the transmission, and change the order of generated rotation pulsation.

The rotation pulsation generating mechanism may further include a flywheel fixed to an output shaft to which the rotation target is fixed. The flywheel is operable to keep the rotational speed of the rotation target at a given value.

The rotation pulsation generating mechanism may further include a clutch provided between the drive motor and the cam, and the clutch may be configured to cut off transmission of rotary power from the drive motor. Since the rotary power of the drive motor is blocked by the clutch, and the drive motor can be stopped, electric power consumed by the drive motor can be reduced.

Further, the rotation pulsation generating mechanism may further include a brake that puts a brake on rotation of the output shaft. In this case, the drive motor need not absorb regenerative energy during braking, and the capacity of the drive motor can be reduced.

According to the disclosure, it is possible to provide the rotation pulsation generating mechanism in which the capacity of the drive motor is small, and the drive motor can be easily controlled.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Some embodiments of the disclosure will be described in detail with reference to the drawings. It is, however, to be understood that this disclosure is not limited to the following embodiments. Also, the following description and drawings are simplified as needed, for the sake of clarity of explanation.

Figure 1:
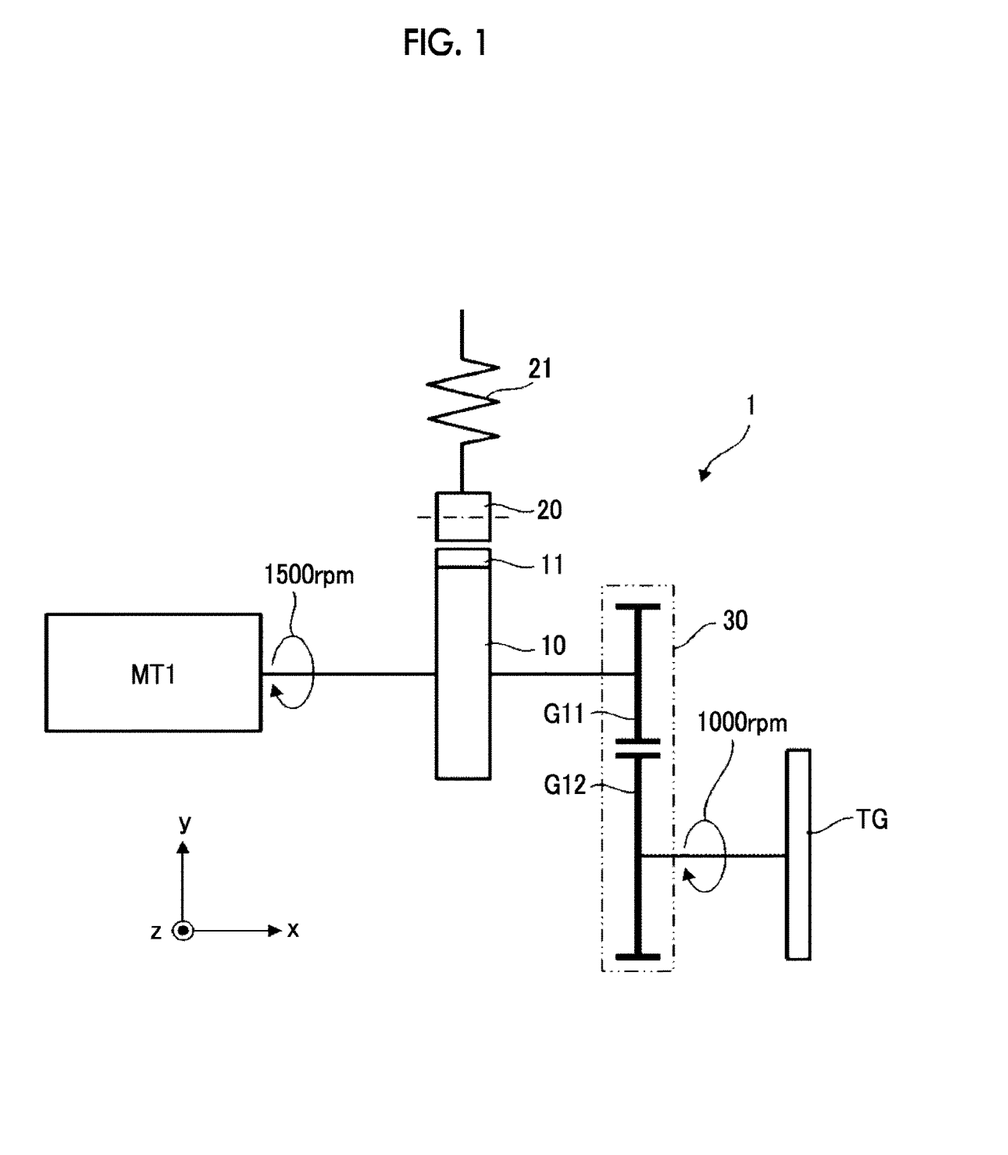
FIG. 1 is a schematic plan view of a rotation pulsation generating mechanism according to a first embodiment.

Initially, referring to FIG. 1, a rotation pulsation generating mechanism according to a first embodiment will be described. FIG. 1 is a schematic plan view of the rotation pulsation generating mechanism according to the first embodiment. As shown in FIG. 1, the rotation pulsation generating mechanism 1 according to this embodiment includes a drive motor MT1, cam 10, cam follower 20, biasing member 21, and a transmission 30.

A right-handed x-y-z coordinate system indicated in FIG. 1 and other drawings is conveniently provided for explaining the positional relationship of constituent elements. Generally, the z-axis positive direction is a vertically upward direction, and the x-y plane is a horizontal plane. This x-y-z system is used in common among the drawings.

As shown in FIG. 1, the cam 10 is fixed to a rotation shaft between the drive motor MT1 and the transmission 30, and is rotated and driven by the drive motor MT1. In the example of FIG. 1, the cam 10 is fixed to the rotation shaft of the drive motor MT1 which extends in the x-axis direction.

Figure 2A:
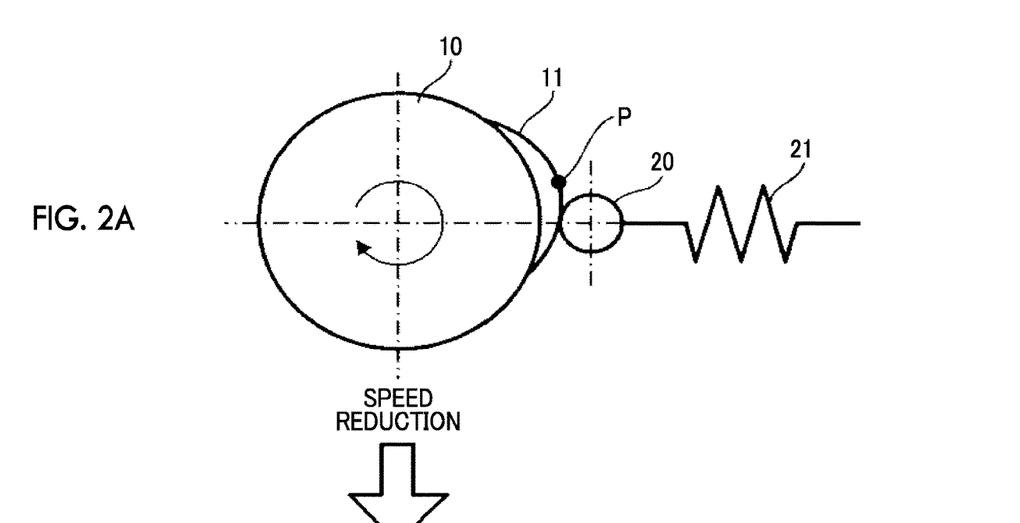
FIG. 2A is a side view of a cam, cam follower, and a biasing member, and is useful for explaining a mechanism for generating rotation pulsation.
Figure 2B:
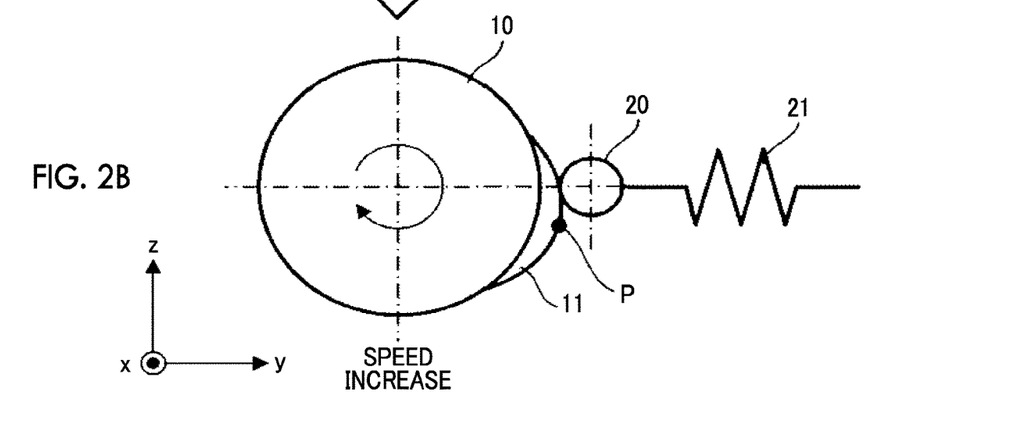
FIG. 2B is a side view of a cam, cam follower, and a biasing member, and is useful for explaining a mechanism for generating rotation pulsation.

FIG. 2A and FIG. 2B are side views of the cam 10, cam follower 20, and the biasing member 21, and these drawings are useful for explaining a mechanism for generating rotation pulsation. The cam 10 shown in FIG. 1, FIG. 2A and FIG. 2B is a so-called plate cam, which is in the form of a circular disc having an outer circumferential surface on which a smooth convex portion 11 is formed. The cam follower 20 that is biased by the biasing member 21 in the y-axis negative direction is pressed against the outer circumferential surface of the cam 10. The type of the cam 10 is not particularly limited, but may be a grooved cam, for example. In FIG. 1, the cam 10 and the cam follower 20 are depicted such that they are spaced from each other, for the sake of easy understanding.

A bearing having a rotational axis parallel to the x-axis, for example, is preferably used as the cam follower 20. By using the bearing as the cam follower 20, it is possible to reduce friction between the cam 10 and the cam follower 20. As the biasing member 21, a spring member, such as an air spring or a coil spring, may be used.

As described above, the cam follower 20 biased by the biasing member 21 in the y-axis negative direction is pressed against the outer circumferential surface of the cam 10. Therefore, as shown in FIG. 2A, during a period from the time when the cam follower 20 comes into contact with the convex portion 11 to the time when the cam follower 20 reaches a peak P of the convex portion 11 while the cam 10 makes one revolution, the convex portion 11 is pushed by the cam follower 20 in a direction opposite to the direction of rotation of the cam 10, and the speed of rotation of the cam 10 is reduced.

On the other hand, as shown in FIG. 2B, during a period from the time when the cam follower 20 reaches the peak P of the convex portion 11 to the time when the cam follower 20 leaves the convex portion 11, the convex portion 11 is pushed by the cam follower 20 in the direction of rotation of the cam 10, and the speed of rotation of the cam 10 is increased. Thus, each time the cam 10 makes one revolution, the speed of rotation of the cam 10 is reduced and increased once, and rotation pulsation is generated once.

In the example of FIG. 1, the rotational speed of the cam 10 is equal to the rotational speed of the drive motor MT1. Therefore, when the rotational speed of the drive motor MT1 is 1500 rpm, as shown in FIG. 1 by way of example, rotation pulsation of 1500 rpm is generated.

The transmission 30 is coupled between the drive motor MT1 and a rotation target TG. Namely, the transmission 30 is coupled between the cam 10 and the rotation target TG, and includes an input gear G11 and an output gear G12 which mesh with each other. The input gear G11 is fixed to a distal end portion of a rotary shaft of the cam 10 on the x-axis positive side. The rotation target TG is fixed to a rotary shaft, or output shaft, of the output gear G12, which shaft extends from the output gear G12 in the x-axis positive direction.

The speed ratio of the transmission 30 shown in FIG. 1 is 3/2. Therefore, when the rotational speed of the drive motor MT1 is 1500 rpm, the rotational speed of the input gear G11 is 1500 rpm, and the rotational speed of the output gear G12 is 1000 rpm. Accordingly, the rotational speed of the rotation target TG is 1000 rpm.

In the rotation pulsation generating mechanism 1 according to this embodiment, the cam 10 pressed by the cam follower 20 is rotated and driven by the drive motor MT1, so that rotation pulsation according to the rotational speed of the drive motor MT1 is generated, while the rotational speed of the drive motor MT1 is changed by the transmission 30 to the rotational speed of the rotation target, which is different from that of the drive motor MT1. With this arrangement, a given order of rotation pulsation can be applied to the rotation target TG.

In the example of FIG. 1, rotation pulsation of 1500 rpm equal to the rotational speed of the drive motor MT1 is generated, while at the same time the rotational speed of the drive motor MT1 is changed by the transmission 30 to 1000 rpm as the rotational speed of the rotation target TG, so that 1.5-order rotation pulsation is applied to the rotation target TG.

The 1.5-order rotation pulsation appears in a three-cylinder engine, for example. If the input gear G11 and the output gear G12 that constitute the transmission 30 are replaced so as to change the speed ratio, a different order of rotation pulsation can be applied to the rotation target TG. The order of rotation pulsation applied to the rotation target TG may be set as appropriate.

As described above, in the rotation pulsation generating mechanism 1 according to this embodiment, the cam 10 pressed by the cam follower 20 is rotated and driven by the drive motor MT1, so that rotation pulsation according to the rotational speed of the drive motor MT1 is generated. Namely, the rotation pulsation generating mechanism 1 mechanically generates a given order of rotation pulsation while keeping the rotational speed of the drive motor MT1 constant, without directly electrically increasing or reducing the rotational speed of the drive motor MT1. Therefore, the capacity of the drive motor MT1 can be reduced, and the drive motor MT1 can be easily controlled.

Figure 3:
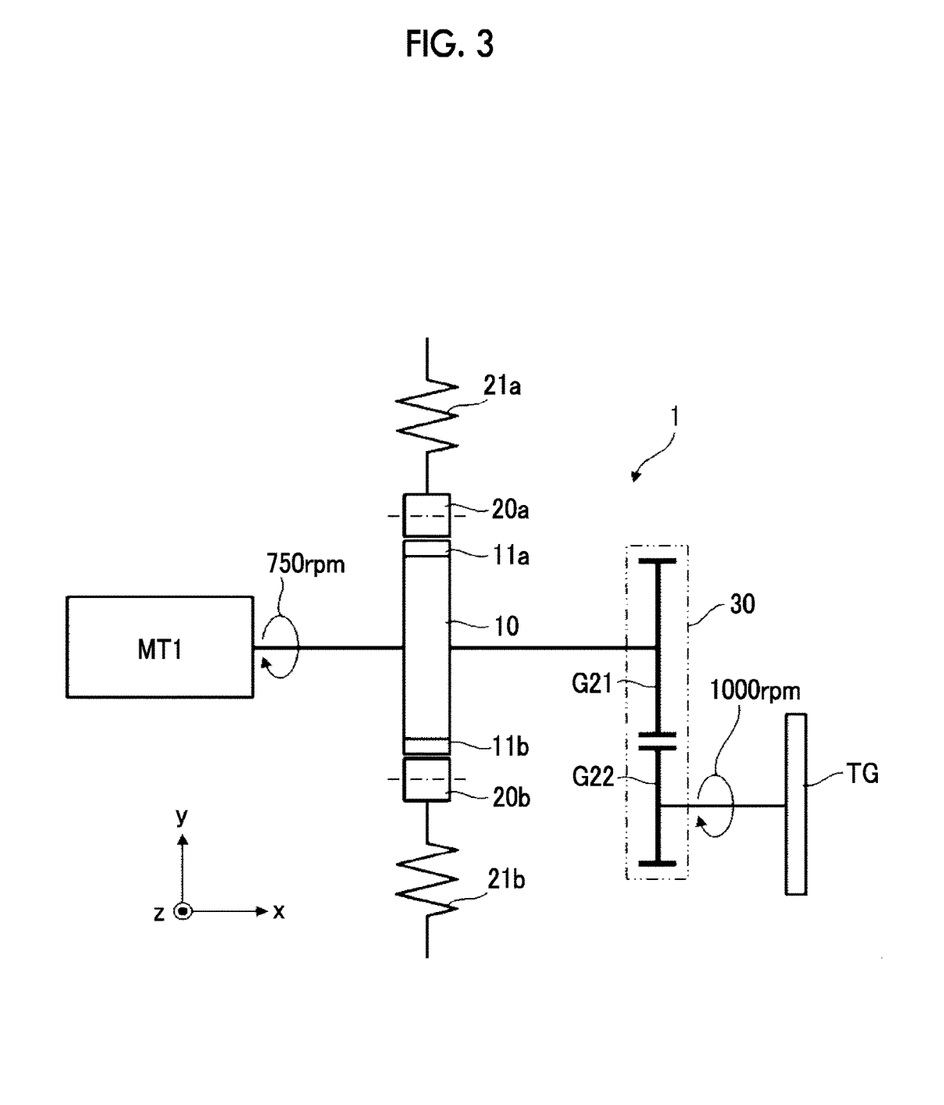
FIG. 3 is a schematic plan view of a rotation pulsation generating mechanism according to a second embodiment.

Next, referring to FIG. 3, a rotation pulsation generating mechanism according to a second embodiment will be described. FIG. 3 is a schematic plan view of the rotation pulsation generating mechanism according to the second embodiment. As shown in FIG. 3, in the rotation pulsation generating mechanism 1 according to this embodiment, the cam 10 has a pair of convex portions 11a, 11b. Also, a cam follower 20a that is biased by a biasing member 21a in the y-axis negative direction, and a cam follower 20b that is biased by a biasing member 21b in the y-axis positive direction are located to be opposed to each other via the cam 10.

Figure 4A:
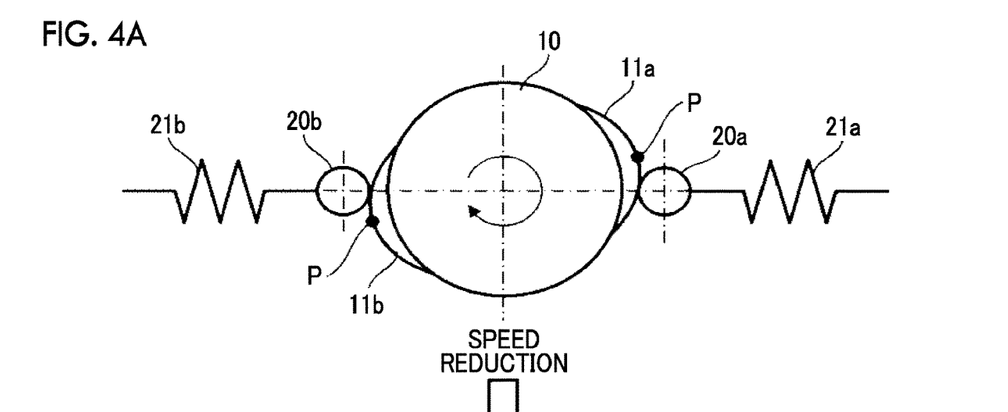
FIG. 4A is a side view of a cam, cam followers, and biasing members, and is useful for explaining a mechanism for generating rotation pulsation.
Figure 4B:
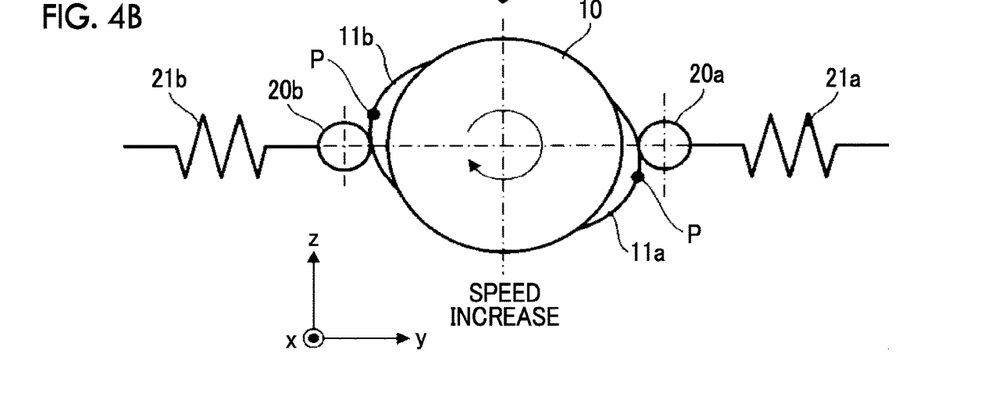
FIG. 4B is a side view of a cam, cam followers, and biasing members, and is useful for explaining a mechanism for generating rotation pulsation.

FIG. 4A and FIG. 4B are side views of the cam 10, cam followers 20a, 20b, and the biasing members 21a, 21b, and these drawings are useful for explaining a mechanism for generating rotation pulsation. The cam 10 shown in FIG. 3, FIG. 4A and FIG. 4B is a so-called plate cam, which is in the form of a circular disc having an outer circumferential surface on which a pair of smooth convex portions 11a, 11b are formed to be opposed to each other. The cam follower 20a biased by the biasing member 21a in the y-axis negative direction, and the cam follower 20b biased by the biasing member 21b in the y-axis positive direction are pressed against the outer circumferential surface of the cam 10. In FIG. 3, the cam 10 and the cam followers 20a, 20b are depicted such that they are spaced from each other, for the sake of easy understanding.

Therefore, as shown in FIG. 4A, during a period from the time when the cam follower 20a comes into contact with the convex portion 11a to the time when the cam follower 20a reaches a peak P of the convex portion 11a, the convex portion 11a is pushed by the cam follower 20a in a direction opposite to the direction of rotation of the cam 10, and the speed of rotation of the cam 10 is reduced. At the same time, during a period from the cam follower 20b comes into contact with the convex portion 11b to the time when the cam follower 20b reaches a peak P of the convex portion 11b, the convex portion 11b is pushed by the cam follower 20b in the direction opposite to the direction of rotation of the cam 10, and the speed of rotation of the cam 10 is reduced.

On the other hand, as shown in FIG. 4B, during a period from the time when the cam follower 20a reaches the peak P of the convex portion 11a to the time when the cam follower 20a leaves the convex portion 11a, the convex portion 11a is pushed by the cam follower 20a in the direction of rotation of the cam 10, and the speed of rotation of the cam 10 is increased. At the same time, during a period from the time when the cam follower 20b reaches the peak P of the convex portion 11b to the time when the cam follower 20b leaves the convex portion 11b, the convex portion 11b is pushed by the cam follower 20b in the direction of rotation of the cam 10, and the speed of rotation of the cam 10 is increased.

Thus, each time the cam 10 makes a half (½) revolution, the speed of rotation of the cam 10 is reduced and increased once, and rotation pulsation is generated once. In other words, each time the cam 10 makes one revolution, the speed of rotation of the cam 10 is reduced and increased twice, and rotation pulsation is generated twice.

In the example of FIG. 3, the rotational speed of the cam 10 is equal to the rotational speed of the drive motor MT1. Therefore, when the rotational speed of the drive motor MT1 is 750 rpm, as shown in FIG. 3 by way of example, rotation pulsation of 1500 rpm is generated.

The transmission 30 is coupled between the cam 10 and the rotation target TG, and includes an input gear G21 and an output gear G22 which mesh with each other. The input gear G21 is fixed to a distal end portion of a rotary shaft of the cam 10 on the x-axis positive side. The rotation target TG is fixed to a rotary shaft, or output shaft, of the output gear G22, which extends from the output gear G22 in the x-axis positive direction.

The speed ratio of the transmission 30 shown in FIG. 3 is ¾. Therefore, when the rotational speed of the drive motor MT1 is 750 rpm, the rotational speed of the input gear G21 is 750 rpm, and the rotational speed of the output gear G22 is 1000 rpm. Accordingly, the rotational speed of the rotation target TG is 1000 rpm.

In the rotation pulsation generating mechanism 1 according to this embodiment, the cam 10 pressed by the cam followers 20a, 20b is rotated and driven by the drive motor MT1, so that rotation pulsation according to the rotational speed of the drive motor MT1 is generated, while the rotational speed of the drive motor MT1 is changed by the transmission 30 to the rotational speed of the rotation target, which is different from that of the drive motor MT1. With this arrangement, a given order of rotation pulsation can be applied to the rotation target TG.

In the example of FIG. 3, while rotation pulsation of 1500 rpm, which is twice as high as the rotational speed (750 rpm) of the drive motor MT1, is generated, the rotational speed of the drive motor MT1 is changed by the transmission 30 to 1000 rpm as the rotational speed of the rotation target TG and 1.5 order of rotation pulsation is applied to the rotation target TG. If the input gear G21 and output gear G22 that constitute the transmission 30 are replaced, and the speed ratio is changed, a different order of rotation pulsation can be applied to the rotation target TG.

As described above, in the rotation pulsation generating mechanism 1 according to this embodiment, too, the cam 10 pressed by the cam followers 20a, 20b is rotated and driven by the drive motor MT1, so that rotation pulsation according to the rotational speed of the drive motor MT1 is generated. Namely, the rotation pulsation generating mechanism 1 mechanically generates rotation pulsation while keeping the rotational speed of the drive motor MT1 constant, without directly electrically increasing or reducing the rotational speed of the drive motor MT1. Therefore, the capacity of the drive motor MT1 can be reduced, and the drive motor MT1 can be easily controlled.

Also, in the rotation pulsation generating mechanism 1 according to this embodiment, the cam follower 20a biased by the biasing member 21a in the y-axis negative direction is located to be opposed to the cam follower 20b biased by the biasing member 21b in the y-axis positive direction, via the cam 10. Therefore, it is possible to suppress vibration generated in the y-axis direction in the rotation pulsation generating mechanism 1, as compared with the first embodiment. The other configuration is substantially identical with that of the first embodiment, and therefore, will not be described in detail.

Figure 5:
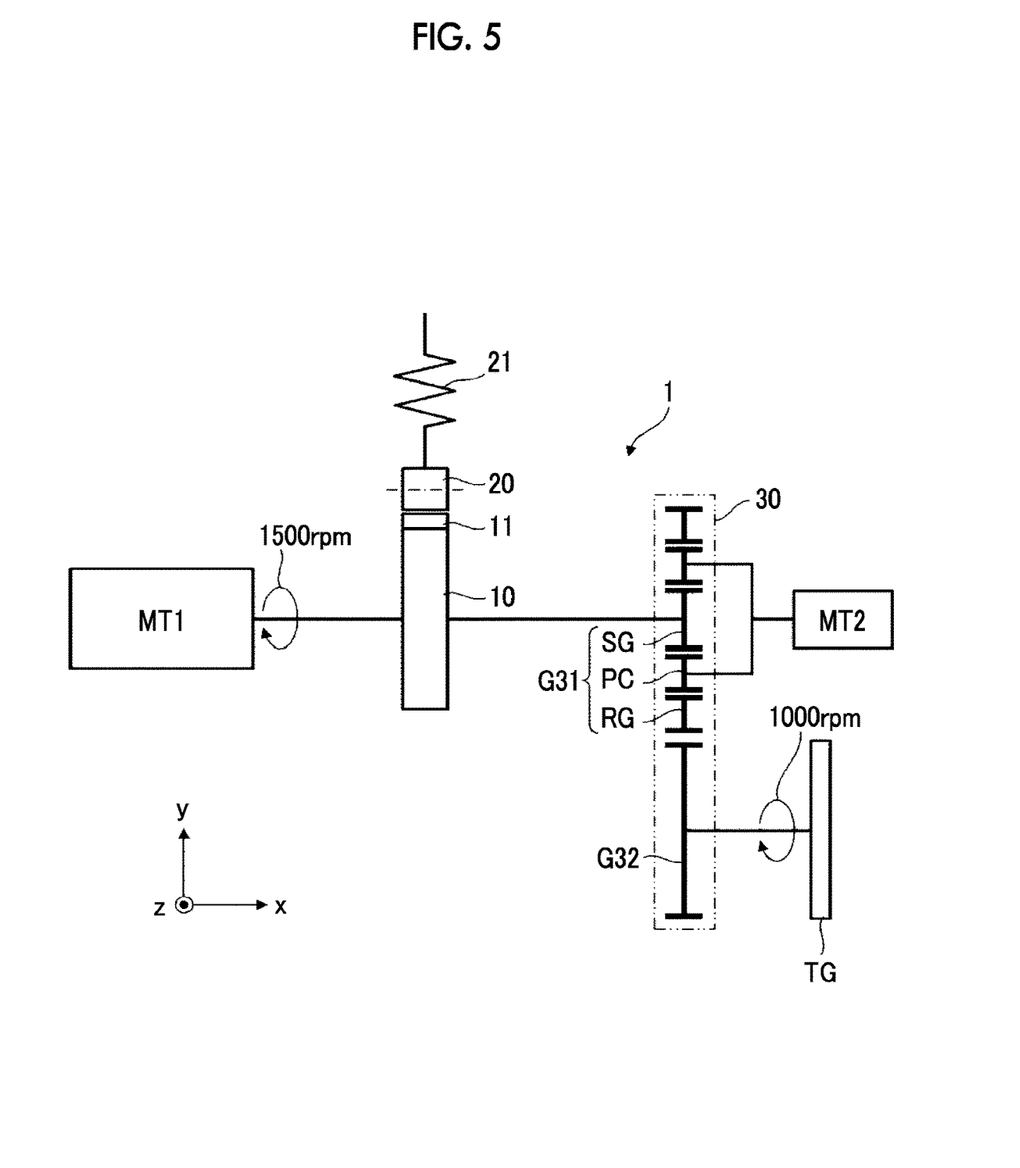
FIG. 5 is a schematic plan view of a rotation pulsation generating mechanism according to a third embodiment.

Next, referring to FIG. 5, a rotation pulsation generating mechanism according to a third embodiment will be described. FIG. 5 is a schematic plan view of the rotation pulsation generating mechanism according to the third embodiment. In the rotation pulsation generating mechanism 1 according to this embodiment, the input gear G11 in the first embodiment shown in FIG. 1 is replaced by a planetary gear.

As shown in FIG. 5, the transmission 30 is coupled between the cam 10 and the rotation target TG, and includes an input gear G31 and an output gear G32 which mesh with each other. The input gear G31 is a planetary gear having a sun gear SG a planetary carrier PC, and a ring gear RG.

The sun gear SG of the input gear G31 is fixed to a distal end portion of a rotary shaft of the cam 10 on the x-axis positive side. An adjustment motor MT2 is coupled to the planetary carrier PC. By adjusting the rotational speed of the adjustment motor MT2, the speed ratio of the input gear G31 can be changed. In the example of FIG. 5, the speed ratio of the input gear G31, when the adjustment motor MT2 is not used, is 3/2=1.5.

The rotation target TG is fixed to a rotary shaft, or output shaft, of the output gear G32, which extends from the output gear G32 in the x-axis positive direction. The speed ratio between the input gear G31 and the output gear G32 shown in FIG. 5 is 1. Therefore, when the rotational speed of the drive motor MT1 is 1500 rpm, as shown in FIG. 5, and the adjustment motor MT2 is not used, the rotational speed of the sun gear SG of the input gear G31 is 1500 rpm, and the rotational speed of the ring gear RG of the input gear G31 is 1000 rpm, while the rotational speed of the output gear G32 is 1000 rpm. Accordingly, the rotational speed of the rotation target TG is 1000 rpm.

In the rotation pulsation generating mechanism 1 according to this embodiment, the cam 10 pressed by the cam follower 20 is rotated and driven by the drive motor MT1, so that rotation pulsation according to the rotational speed of the drive motor MT1 is generated, while the rotational speed of the drive motor MT1 is changed by the transmission 30 to the rotational speed of the rotation target, which is different from that of the drive motor MT1. With this arrangement, a given order of rotation pulsation can be applied to the rotation target TG.

In the example of FIG. 5, when the adjustment motor MT2 is not used, rotation pulsation of 1500 rpm equal to the rotational speed of the drive motor MT1 is generated, and the rotational speed of the drive motor MT1 is changed by the transmission 30 to 1000 rpm as the rotational speed of the rotation target TG, so that 1.5-order rotation pulsation is applied to the rotation target TG.

Next, referring to TABLE 1 and FIG. 6, a specific example in which the speed ratio of the input gear G31 is changed by adjusting the rotational speed of the adjustment motor MT2 will be described. In the rotation pulsation generating mechanism shown in FIG. 5, rotation pulsation whose order is equal to the speed ratio of the transmission 30, or the speed ratio of the input gear G31, can be applied to the rotation target TG. In the example of TABLE 1 and FIG. 6, the order of rotation pulsation is changed in the range of 1.5±0.1. Namely, the order of rotation pulsation is changed from 1.4 to 1.6.

TABLE 1 is a tabulated list indicating the order of rotation pulsation, the rotational speed S of the sun gear SG, the rotational speed C of the planetary carrier PC, and the rotational speed R of the ring gear RG. The unit of the rotational speed is rpm. Here, the rotational speed S of the sun gear SG is equal to the rotational speed of the drive motor MT1, and the rotational speed C of the planetary carrier PC is equal to the rotational speed of the adjustment motor MT2. As shown in TABLE 1, the rotational speed R of the ring gear RG is fixed to −1000 (R=−1000). Namely, the rotational speed of the rotation target TG is fixed to 1000 rpm. The minus sign of the rotational speed of the ring gear RG means that the ring gear RG rotates in the reverse direction.

Figure 6:
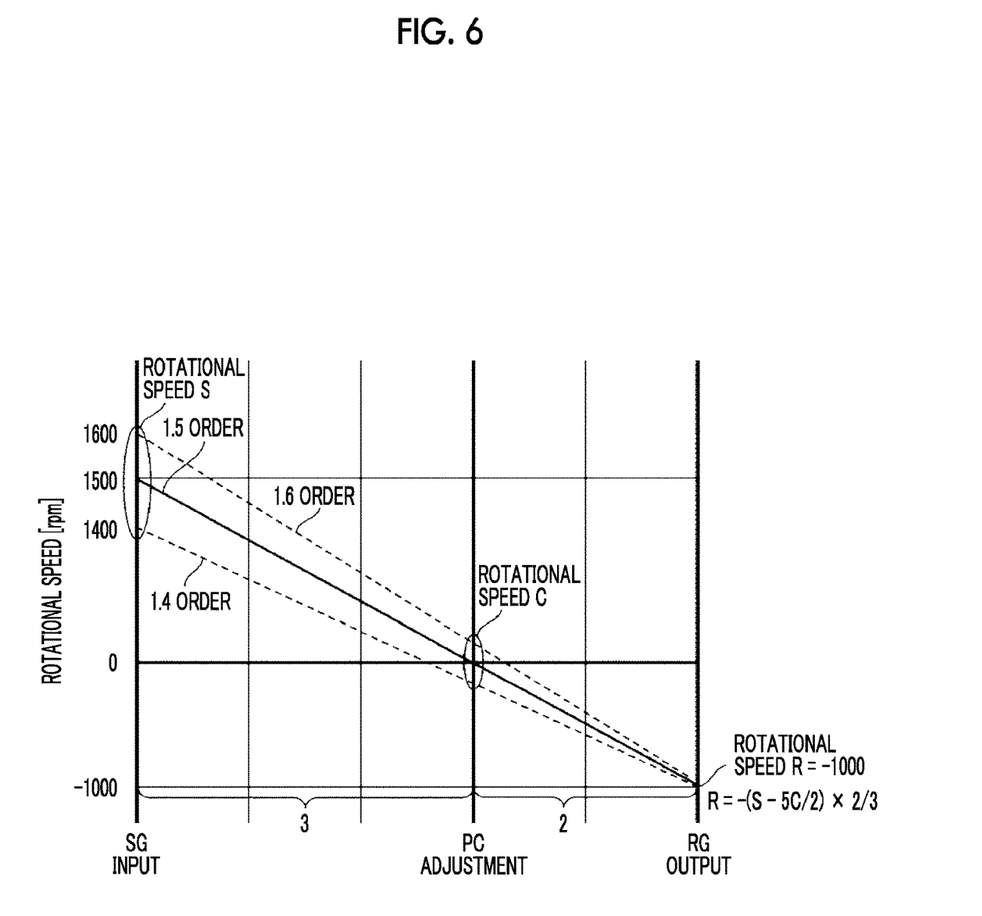
FIG. 6 is a planetary-gear nomographic chart indicating the relationship among the rotational speed of a sun gear, rotational speed of a planetary carrier, and the rotational speed of a ring gear, as indicated in TABLE 1.

FIG. 6 is a planetary-gear nomographic chart indicating the relationship among the rotational speed S of the sun gear SG the rotational speed C of the planetary carrier PC, and the rotational speed R of the ring gear RG, as indicated below in TABLE 1. FIG. 6 shows the cases where the order of rotation pulsation is 1.4, 1.5, and 1.6. As shown in FIG. 6, the relationship of $R=-(S-5C/2)\times 2/3$ is established among the rotational speed S of the sun gear SG the rotational speed C of the planetary carrier PC, and the rotational speed R of the ring gear RG.

As shown in FIG. 6, the rotational speed C of the planetary carrier PC is adjusted by the adjustment motor MT2, in accordance with increase/reduction of the rotational speed S of the sun gear SG as an input, so that the rotational speed R of the ring gear RG as an output is kept constant. With this arrangement, the order of rotation pulsation generated can be changed.

Thus, in the rotation pulsation generating mechanism 1 according to this embodiment, the input gear G31 is the planetary gear, and includes the adjustment motor MT2 coupled to the planetary gear. Therefore, the speed ratio of the transmission 30 can be changed by adjusting the rotational speed of the adjustment motor MT2, and the order of rotation pulsation generated can be changed.

In the rotation pulsation generating mechanism 1 according to the first embodiment, the gears of the transmission 30 need to be replaced so as to change the speed ratio. However, in the rotation pulsation generating mechanism 1 according to this embodiment, the speed ratio can be changed without replacing the gears of the transmission 30.

TABLE 1

| ORDER | S | C | R |
|---|---|---|---|
| 1.60 | 1600 | 40 | −1000 |
| 1.58 | 1580 | 32 | −1000 |
| 1.56 | 1560 | 24 | −1000 |
| 1.54 | 1540 | 16 | −1000 |
| 1.52 | 1520 | 8 | −1000 |
| 1.50 | 1500 | 0 | −1000 |
| 1.48 | 1480 | −8 | −1000 |
| 1.46 | 1460 | −16 | −1000 |
| 1.44 | 1440 | −24 | −1000 |
| 1.42 | 1420 | −32 | −1000 |
| 1.40 | 1400 | −40 | −1000 |

Figure 7:
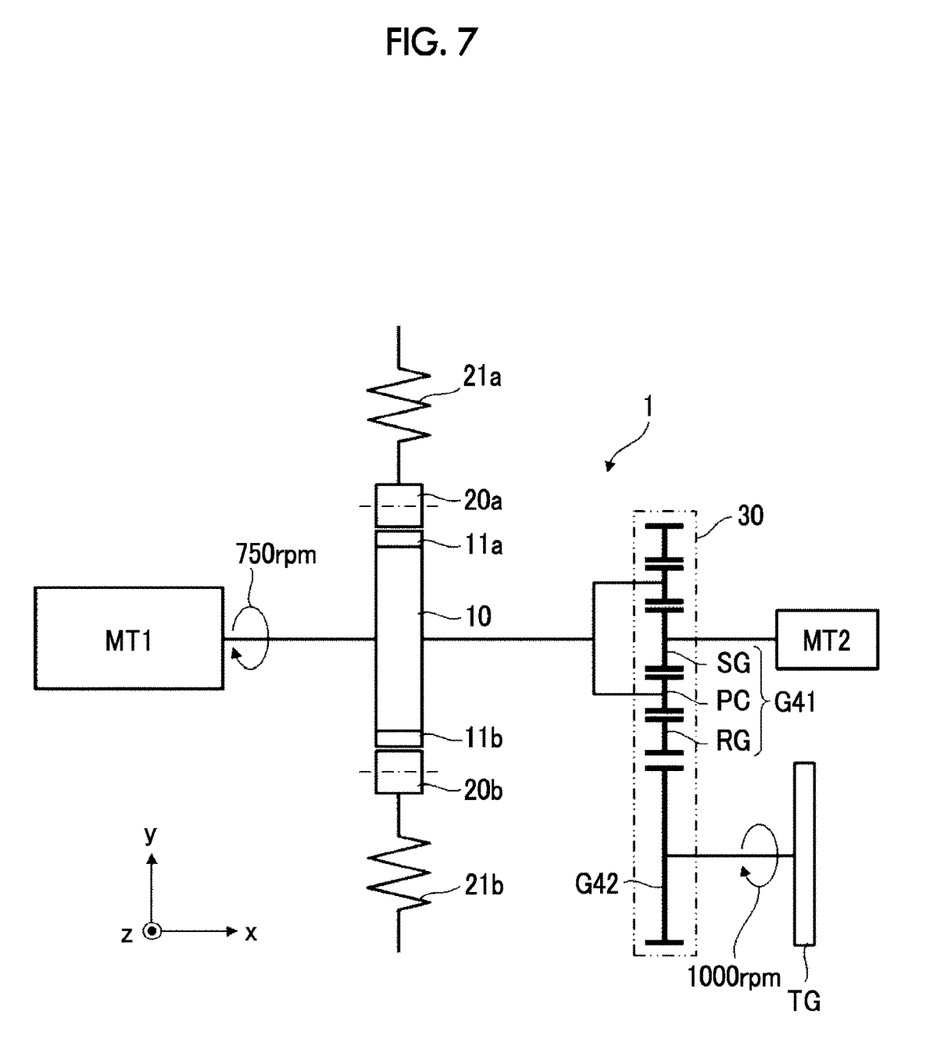
FIG. 7 is a schematic plan view of a rotation pulsation generating mechanism according to a fourth embodiment.

Next, referring to FIG. 7, a rotation pulsation generating mechanism according to a fourth embodiment will be described. FIG. 7 is a schematic plan view of the rotation pulsation generating mechanism according to the fourth embodiment. In the rotation pulsation generating mechanism 1 according to this embodiment, the input gear G21 of the second embodiment shown in FIG. 3 is replaced by a planetary gear.

As shown in FIG. 7, the transmission 30 is coupled between the cam 10 and the rotation target TG, and includes an input gear G41 and an output gear G42 which mesh with each other. The input gear G41 is a planetary gear having a sun gear SG, a planetary carrier PC, and a ring gear RG. The planetary carrier PC of the input gear G41 is fixed to a distal end portion of a rotary shaft of the cam 10 on the x-axis positive side. An adjustment motor MT2 is coupled to the sun gear SG. By adjusting the rotational speed of the adjustment motor MT2, it is possible to change the speed ratio of the input gear G41. In the example of FIG. 7, the speed ratio of the input gear G41 when the adjustment motor MT2 is not used is 3/4.

The rotation target TG is fixed to a rotary shaft, or output shaft, of the output gear G42, which extends from the output gear G42 in the x-axis positive direction. The speed ratio between the input gear G41 and the output gear G42 shown in FIG. 7 is 1. Therefore, when the rotational speed of the motor MT1 is 750 rpm, as shown in FIG. 7, and the adjustment motor MT2 is not used, the rotational speed of the planetary carrier PC of the input gear G41 is 750 rpm, and the rotational speed of the ring gear RG of the input gear G41 is 1000 rpm, while the rotational speed of the output gear G42 is 1000 rpm. Accordingly, the rotational speed of the rotation target TG is 1000 rpm.

In the rotation pulsation generating mechanism 1 according to this embodiment, the cam 10 pressed by the cam followers 20a, 20b is rotated and driven by the drive motor MT1, so that rotation pulsation according to the rotational speed of the drive motor MT1 is generated, while the rotational speed of the drive motor MT1 is changed by the transmission 30 to the rotational speed of the rotation target, which is different from that of the drive motor MT1. With this arrangement, a given order of rotation pulsation can be applied to the rotation target TG.

In the example of FIG. 7, when the adjustment motor MT2 is not used, the rotational speed (750 rpm) of the drive motor MT1 is changed by the transmission 30 to the rotational speed (1000 rpm) of the rotation target TG, while rotation pulsation of 1500 rpm that is twice as high as the rotational speed (750 rpm) of the drive motor MT1 is generated, so that 1.5-order rotation pulsation is applied to the rotation target TG.

Next, referring to TABLE 2 and FIG. 8, a specific example in which the speed ratio of the input gear G41 is changed by adjusting the rotational speed of the adjustment motor MT2 will be described. In the rotation pulsation generating mechanism shown in FIG. 7, rotation pulsation whose order is twice as large as the speed ratio of the transmission 30, or the speed ratio of the input gear G41, can be applied to the rotation target TG. In the example of TABLE 2 and FIG. 8, the order of rotation pulsation is changed in the range of 1.5±0.1. Namely, the order of rotation pulsation is changed from 1.4 to 1.6.

TABLE 2 is a tabulated list indicating the order of rotation pulsation, the rotational speed S of the sun gear SG the rotational speed C of the planetary carrier PC, and the rotational speed R of the ring gear RG. The unit of the rotational speed is rpm. Here, the rotational speed S of the sun gear SG is equal to the rotational speed of the adjustment motor MT2, and the rotational speed C of the planetary carrier PC is equal to the rotational speed of the drive motor MT1. As shown in TABLE 2, the rotational speed R of the ring gear RG is fixed to 1000 (R=1000). Namely, the rotational speed of the rotation target TG is fixed to 1000 rpm.

Figure 8:
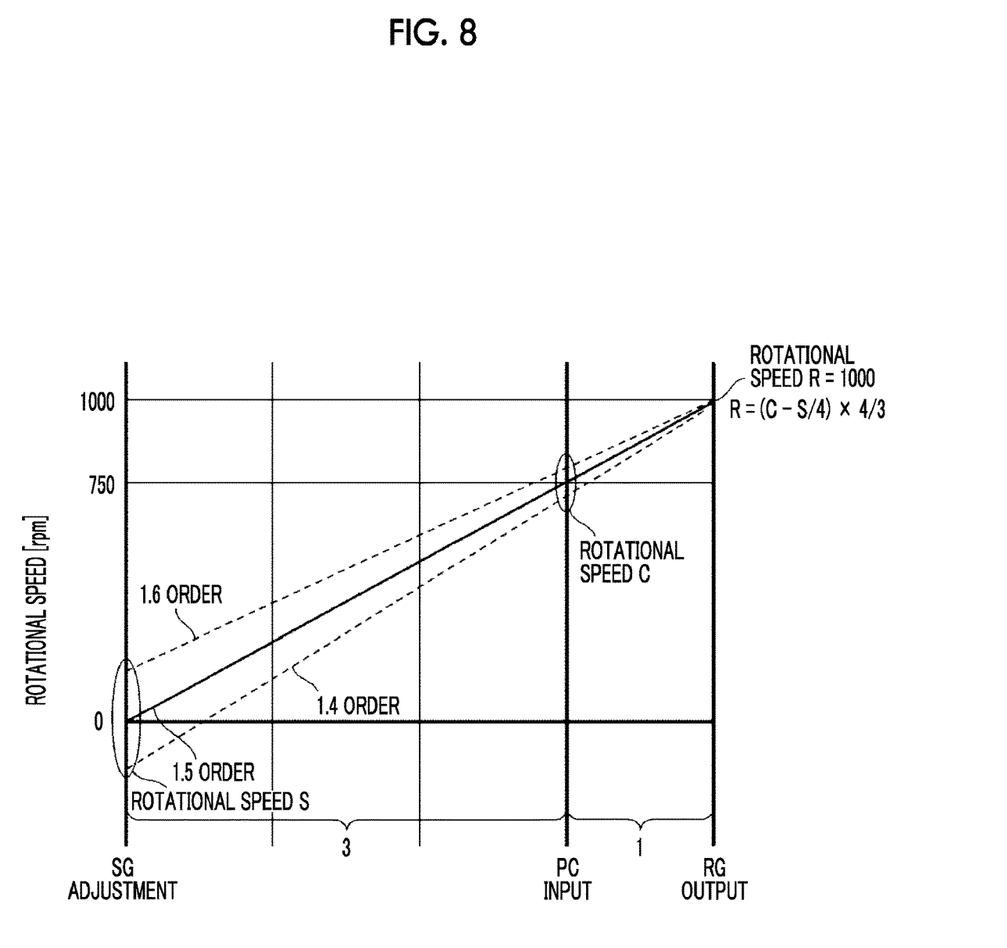
FIG. 8 is a planetary-gear nomographic chart indicating the relationship among the rotational speed of a sun gear, rotational speed of a planetary carrier PC, and the rotational speed of a ring gear, as indicated in TABLE 2.

FIG. 8 is a planetary-gear nomographic chart indicating the relationship among the rotational speed S of the sun gear SG, the rotational speed C of the planetary carrier PC, and the rotational speed R of the ring gear RG, as indicated below in TABLE 2. FIG. 8 shows the cases where the order of rotation pulsation is 1.4, 1.5, and 1.6. As shown in FIG. 8, the relationship of $R=(C-S/4) \times 4/3$ is established among the rotational speed S of the sun gear SG, the rotational speed C of the planetary carrier PC, and the rotational speed R of the ring gear RG.

As shown in FIG. 8, the rotational speed S of the sun gear SG is adjusted by the adjustment motor MT2, in accordance with increase/reduction of the rotational speed C of the planetary carrier PC as an input, so that the rotational speed R of the ring gear RG as an output is kept constant. With this arrangement, the order of rotation pulsation generated can be changed.

Thus, in the rotation pulsation generating mechanism 1 according to this embodiment, the input gear G41 is the planetary gear, and includes the adjustment motor MT2 coupled to the planetary gear. Therefore, the speed ratio of the transmission 30 can be changed by adjusting the rotational speed of the adjustment motor MT2. Therefore, the order of rotation pulsation generated can be changed.

In the rotation pulsation generating mechanism 1 according to the second embodiment, the gears of the transmission 30 need to be replaced so as to change the speed ratio. However, in the rotation pulsation generating mechanism 1 according to this embodiment, the speed ratio can be changed without replacing the gears of the transmission 30.

TABLE 2

| ORDER | S | C | R |
|---|---|---|---|
| 1.60 | 200 | 800 | 1000 |
| 1.58 | 160 | 790 | 1000 |
| 1.56 | 120 | 780 | 1000 |
| 1.54 | 80 | 770 | 1000 |
| 1.52 | 40 | 760 | 1000 |
| 1.50 | 0 | 750 | 1000 |
| 1.48 | −40 | 740 | 1000 |
| 1.46 | −80 | 730 | 1000 |
| 1.44 | −120 | 720 | 1000 |
| 1.42 | −160 | 710 | 1000 |
| 1.40 | −200 | 700 | 1000 |

Figure 9:
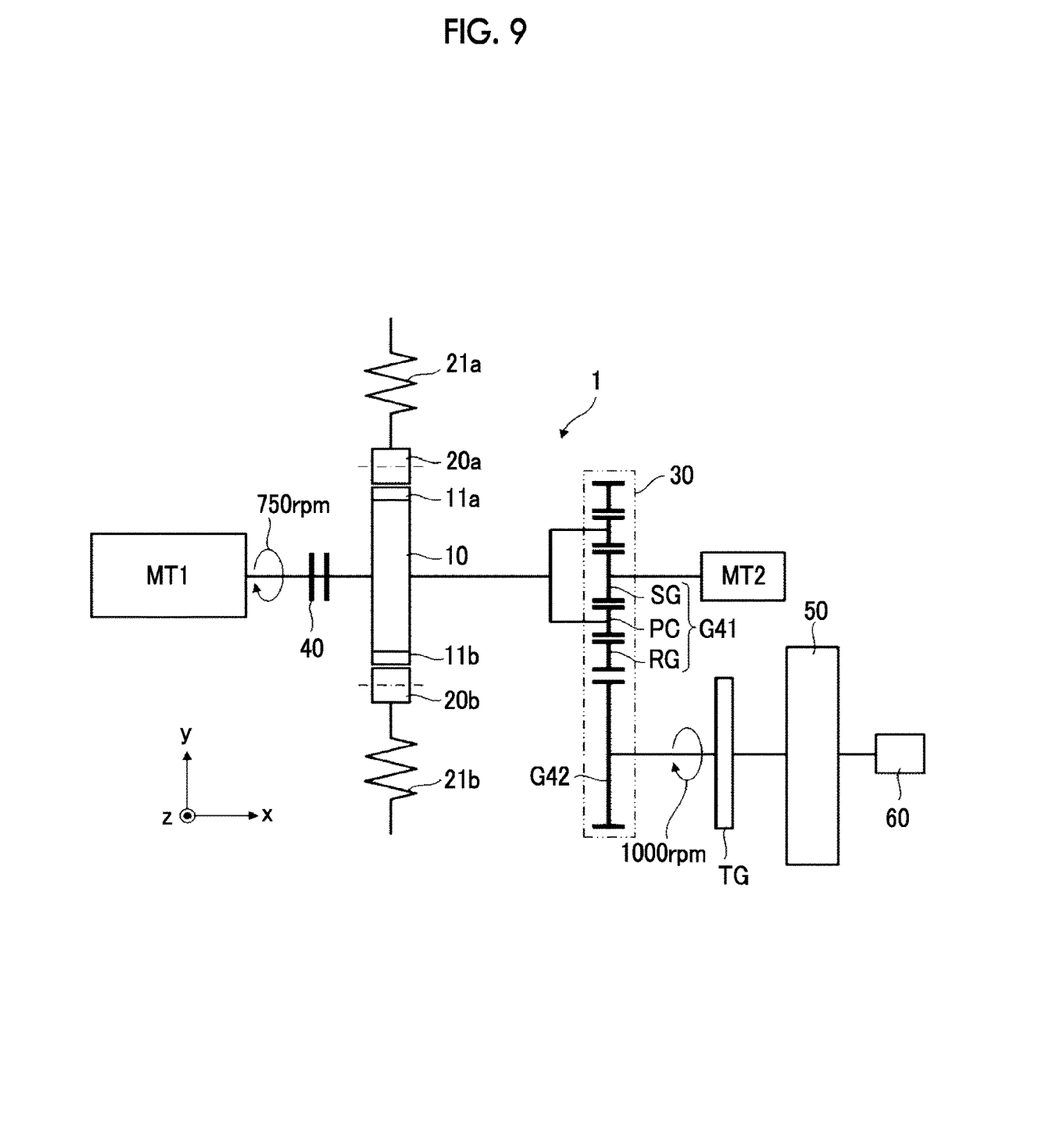
FIG. 9 is a schematic plan view of a rotation pulsation generating mechanism according to a fifth embodiment.

Next, referring to FIG. 9, a rotation pulsation generating mechanism according to a fifth embodiment will be described. FIG. 9 is a schematic plan view of the rotation pulsation generating mechanism according to the fifth embodiment. The rotation pulsation generating mechanism 1 according to this embodiment is provided by adding a clutch 40, a flywheel 50, and a brake 60 to the rotation pulsation generating mechanism 1 according to the fourth embodiment shown in FIG. 7.

As shown in FIG. 9, the clutch 40 is provided between the drive motor MT1 and the cam 10, and is operable to cut off transmission of rotary power from the drive motor MT1. After the rotational speed of the rotation target TG reaches a given value by means of the drive motor MT1, the rotary power of the drive motor MT1 is blocked by the clutch 40, and the drive motor MT1 can be stopped.

The flywheel 50 is fixed to an output shaft to which the rotation target TG is fixed, and rotates along with the rotation target TG. Thus, even after the rotary power of the drive motor MT1 is blocked by the clutch 40, the rotational speed of the rotation target TG can be kept at the given value by means of the flywheel 50 having a large mass. In the example of FIG. 9, the flywheel 50 is provided at the distal side (x-axis positive side) of the output shaft relative to the rotation target TG.

The brake 60 puts a brake on rotation of the output shaft to which the rotation target TG is fixed. In the example of FIG. 9, the brake 60 is provided in a distal end portion of the output shaft to which the rotation target TG is fixed. As the brake 60, an air brake, for example, may be used.

In the rotation pulsation generating mechanism 1 according to this embodiment, after the rotational speed of the rotation target TG reaches the given value by means of the drive motor MT1, the rotary power of the drive motor MT1 is blocked by the clutch 40, and the drive motor MT1 can be stopped. At this time, the rotational speed of the rotation target TG can be kept at the given value by the flywheel 50. Therefore, electric power consumed by the drive motor MT1 can be reduced. After the drive motor MT1 is disconnected from the cam 10 by the clutch 40, a brake is applied by the brake 60. Therefore, the drive motor MT1 need not absorb regenerative energy during braking, and the capacity of the drive motor MT1 can be reduced.

Figure 10:
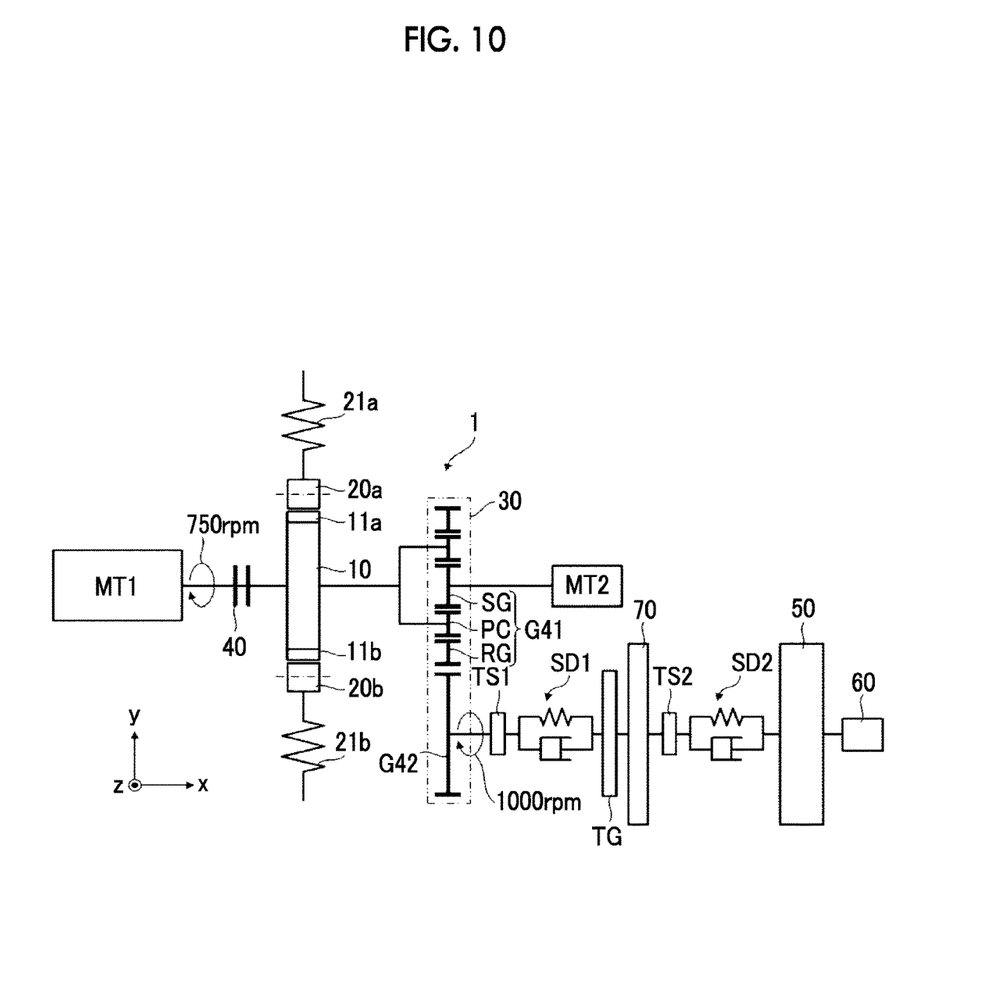
FIG. 10 is a schematic plan view of a test system to which the rotation pulsation generating mechanism according to the fifth embodiment is applied.

Next, referring to FIG. 10, a test system to which the rotation pulsation generating mechanism according to the fifth embodiment is applied will be described. FIG. 10 is a schematic plan view of the test system to which the rotation pulsation generating mechanism according to the fifth embodiment is applied. This test system applies generated rotation pulsation to a damper as the rotation target TG, and evaluates damping performance of the rotation target TG.

As shown in FIG. 10, a spring damper SD1 is provided between the output gear G42 and the rotation target TG. A torque sensor TS1 for measuring torque of the output gear G42 is provided between the output gear G42 and the spring damper SD1. The torque sensor TS1 measures torque variations caused by rotation pulsation generated by the cam 10.

On the other hand, a spring damper SD2 is provided between the flywheel 50 and the rotation target TG. Then, a torque sensor TS2 for measuring torque variations damped or attenuated via the rotation target TG is provided between the rotation target TG and the spring damper SD2. The damping performance of the rotation target TG can be evaluated by comparing the torque variations measured by the torque sensor TS1, with the torque variations measured by the torque sensor TS2.

In FIG. 10, an adjustment flywheel 70 for adjusting the moment of inertia of the rotation target TG is provided between the spring damper SD1 and the spring damper SD2, but may not be necessarily provided.

It is to be understood that the disclosure is not limited to the above-described embodiments, but may be changed as appropriate, without departing from the principle of the disclosure.

What is claimed is:

1. A rotation pulsation generating mechanism, comprising:
    a drive motor;
    a transmission coupled between the drive motor and a rotation target;
    a cam fixed to a rotary shaft between the drive motor and the transmission and configured to be rotated and driven by the drive motor; and
    a cam follower configured to be biased so as to press the cam,
    wherein the cam pressed by the cam follower is configured to be rotated and driven by the drive motor so as to generate rotation pulsation according to a rotational speed of the drive motor, and the transmission is configured to change the rotational speed of the drive motor to a rotational speed of the rotation target which is different from the rotational speed of the drive motor, so that a given order of rotation pulsation is applied to the rotation target,
    wherein the cam and the drive motor are coaxially mounted, and
    the cam follower is configured to press the cam in a direction perpendicular to a rotation axis of the cam.

2. The rotation pulsation generating mechanism according to claim 1, wherein the transmission includes a planetary gear, and an adjustment motor coupled to the planetary gear, and a rotational speed of the adjustment motor is changed, so as to change a speed ratio of the transmission.

3. The rotation pulsation generating mechanism according to claim 1, further comprising a flywheel fixed to an output shaft to which the rotation target is fixed.

4. The rotation pulsation generating mechanism according to claim 3, further comprising a clutch provided between the drive motor and the cam, the clutch being configured to cut off transmission of rotary power from the drive motor.

5. The rotation pulsation generating mechanism according to claim 4, further comprising a brake that puts a brake on rotation of the output shaft.

* * * * *